US012619700B2

(12) United States Patent
McGregor

(10) Patent No.: US 12,619,700 B2
(45) Date of Patent: May 5, 2026

(54) SYSTEM AND METHOD FOR HUMAN AUTHENTICATION USING GRAPHENE MEMBRANE FOR UNOBSTRUCTED OPTICAL, ULTRASOUND, AND CAPACITANCE SENSORY AND COMMUNICATION IN DISTRIBUTED COMPUTING CARD FORMAT

(71) Applicant: SLC Corporation, Las Vegas, NV (US)

(72) Inventor: Travis Melchin McGregor, Las Vegas, NV (US)

(73) Assignee: SLC Corporation, Las Vegas, NV (US)

( * ) Notice: Subject to any disclaimer, the term of this patent is extended or adjusted under 35 U.S.C. 154(b) by 0 days.

(21) Appl. No.: 18/809,607

(22) Filed: Aug. 20, 2024

(65) Prior Publication Data

US 2025/0307373 A1      Oct. 2, 2025

(51) Int. Cl.
*G06F 21/34* (2013.01)
*H04L 9/30* (2006.01)

(52) U.S. Cl.
CPC ................ *G06F 21/34* (2013.01); *H04L 9/30* (2013.01)

(58) Field of Classification Search
CPC .............. G06F 21/34; H04L 9/30; H04L 9/50
See application file for complete search history.

(56) References Cited

U.S. PATENT DOCUMENTS 6,816,058 B2 * 11/2004 McGregor ......... G06Q 20/3415
                                                            235/379
11,892,425 B2 * 2/2024 Hummer ............ G01N 27/3273
(Continued)

FOREIGN PATENT DOCUMENTS

WO      WO-2009141936 A1 * 11/2009 ........... G06F 21/606
WO      WO-2016171295 A1 * 10/2016 ........... H04L 9/3231
WO      WO-2021049991 A1 * 3/2021 ........... H04L 9/0866

OTHER PUBLICATIONS

McIntyre, Ethereum Virtual Machine Blockchains and Ethereum Classic, Ethereum Classic Blog, p. 1-8 (Year: 2022).*

(Continued)

*Primary Examiner* — Christopher A Revak
(74) *Attorney, Agent, or Firm* — Schott, P.C.

(57)      ABSTRACT

This invention relates to a system and method for human authentication utilizing a graphene membrane for human skin scanning, imaging, and communication to determine unique neuron patterns for use in authentication and psychological profiling. The system employs a graphene membrane, which integrates unobstructed optical, ultrasound, and capacitance sensors within a distributed computing smartcard format device. The graphene membrane optical sensors capture high-resolution images of fingerprint ridges and valleys, while the ultrasound sensors generate detailed 3D maps of both surface and subsurface skin structures. Capacitance sensors measure the electrical properties of the skin, further enhancing the biometric data obtained. The biometric data is combined and used to identify distinct neuron patterns embedded in the skin. The system may be manufactured in compact card format and durable, ensuring seamless integration into standard identification card formats and to act as a consensus node for Proof-of-KYC (Know Your Customer).

1 Claim, 4 Drawing Sheets

(56)        References Cited

U.S. PATENT DOCUMENTS

2002/0026575 A1 *   2/2002   Wheeler ............. G06Q 20/403
                                                        705/78
2008/0067247 A1 *   3/2008   McGregor ......... G06K 19/0704
                                                        235/380
2015/0312041 A1 *  10/2015   Choi ................... H04L 63/0861
                                                        713/175
2016/0071101 A1 *   3/2016   Winarski ............... G06V 40/40
                                                        705/71
2024/0212446 A1 *   6/2024   Soukup .............. G07F 17/3244
2025/0157600 A1 *   5/2025   Paria ...................... G16H 10/40

OTHER PUBLICATIONS

Yadav et al, Transforming the Know Your Customer (KYC) Process
Using Block, 2019 International Conference on Advances in Com-
puting, Communication and Control (ICAC3), p. 1-5 (Year: 2020).*
Imtiaz et al, Smart Identity Management System Using Blockchain
Technology, 2023 IEEE International Conference on Blockchain
and Distributed System Security, p. 1-7 (Year: 2023).*
Tavares et al, WalliD: Secure your ID in Ethereum Wallet, 2018
International Conference on Intelligent Systems, p. 1-8 (Year:
2018).*

* cited by examiner

SYSTEM AND METHOD FOR HUMAN AUTHENTICATION USING GRAPHENE MEMBRANE FOR UNOBSTRUCTED OPTICAL, ULTRASOUND, AND CAPACITANCE SENSORY AND COMMUNICATION IN DISTRIBUTED COMPUTING CARD FORMAT

CROSS REFERENCE TO RELATED APPLICATIONS

This application claims the benefit of U.S. Application No. 63/520,826, filed on Aug. 21, 2023, with the Title "Method and Apparatus for Human Chimera-Neuron Light Biometric Smart Card to Determine Human vs. Machine vs. AI/Binary Electrical Processing for Neuron Matching"; this provisional application is hereby incorporated herein by reference thereto in its entirety for all purposes.

BACKGROUND OF THE INVENTION

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

1. FIELD OF THE INVENTION

Embodiments of the present invention generally relate to biometric and psychological profiling via granular imaging of human skin to enhance security and authentication for cloud computing in the industries of government, healthcare, and financial services, and banking.

2. DESCRIPTION OF THE RELATED ART

Currently-pending application Ser. No. 18/610,571 titled "System and Method for Secure-Core Silicon Mobile End-Points to Determine KYC and KYT" introduces KYC ("Know Your Customer") in secure-silicon in the form of a SIM and MEMS device for human authentication record on-chain. Other related art includes McGregor et al, U.S. Pat. No. 6,954,133 (Biometric Smart-Card, Biometric Smart-Card Reader, and Method of Use) and McGregor et al, U.S. Pat. No. 6,816,058 (Biometric Smart-Card, Biometric Smart-Card Reader, and Method of Use).

Despite advancements in state-of-the-art artificial intelligence and quantum computing, including achieving significant results using 53 qubits, current systems still rely on traditional materials like aluminum and indium parts sandwiched between silicon wafers. When used in smartphones, these traditional materials lack deep granular scanning and imaging abilities, making these materials incapable of performing optimum neuron matching and communications functions. While smartphones from manufacturers such as Samsung, Apple, Huawei, Xiaomi, Oppo, Vivo, Motorola, Lenovo, ZTE, and HTC offer immense value in interacting with humans across various industries and applications, these smartphones are limited in their capabilities.

Specifically, attempts to modify smartphones to transmit and receive light and ultrasound signals to perform electrical capacitance sensing fall short in accurately and efficiently communicating with and scanning patterns in the skin for neurons functioning in human beings. Consequently, existing smartphones are inadequate to handle the tasks involved in acquiring biometric data for use in secure electronic transactions.

SUMMARY OF THE INVENTION

An aspect of the present invention provides a smartcard including a microcomputer, a substrate inlay, and a smartcard face. The smartcard face includes a human authentication input region, and a display region for displaying information. The physical size of the smartcard conforms to an ISO standard. The substrate inlay underneath the human authentication input region includes a sensor, and the sensor may include quartz, graphene, a graphene layer, or a graphene layer that includes graphene oxide.

An aspect of the present invention provides a computer-implemented method of transaction recordation. Each human party or plurality of parties performs a KYC operation using a smartcard that measures biometric data. Based on each performed KYC operation, the corresponding smartcard generates a private-public encryption key pair. In response to transaction data for a transaction among the plurality of parties being received by an Ethereum Virtual Machine (EVM), the EVM computes a transaction data hash using at least a portion of the received transaction data by performing a cryptographic hash function. The EVM encrypts the transaction data hash using a public key of a destination organization. For each human party of the plurality of parties, the EVM encrypts the encrypted transaction data hash using the corresponding public key to generate a corresponding encrypted ciphertext message. For each corresponding encrypted ciphertext message, the EVM stores the corresponding encrypted ciphertext message and the associated public key on-chain.

BRIEF DESCRIPTION OF THE DRAWINGS

So that the manner in which the above recited features, advantages and objects of the present invention are attained and can be understood in detail, a more particular description of the present invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION OF THE PREFERRED EMBODIMENT

Figure 1:
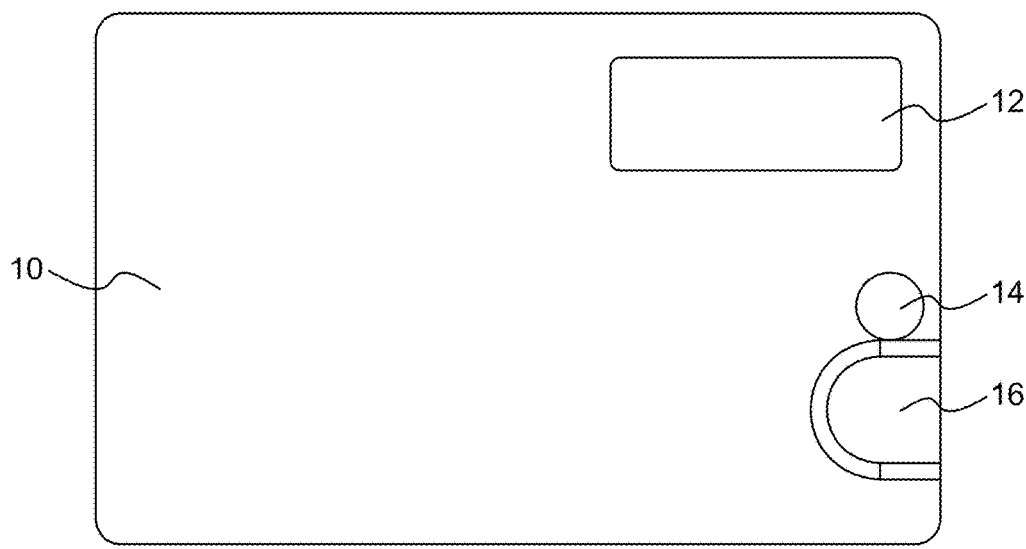
FIG. 1 illustrates a hot or cold laminate smartcard that meets ISO card international standards that define the physical properties.

This invention centers around a sophisticated human authentication system that leverages advanced finger skin scanning to detect unique neuron patterns. Embodiments of the invention integrates optical, ultrasound, and capacitance sensors, which are embedded in a device that adheres to card format for physical requirements for identification cards. Some embodiments of the invention include a graphene substrate as described below.

Aspects of the invention utilize the unique physiological characteristics associated with individual neural patterns and provide higher resolution imaging and additional imaging data capture over traditional biometric authentication methods, which rely mainly on surface features such as fingerprints. The integration of detailed 3D maps and electrical properties offers a multi-layered approach to authentication and a gateway into physiological profiling and human intent.

Some embodiments of this invention capture high resolution fingerprint images for personality trait analysis via graphene-enhanced fingerprint imaging operating and in a self-contained distributed computing smartcard format device. Some embodiments of this invention will integrate graphene-based multi-sensory fingerprint sensors suitable to analyze personality traits using the Big Five personality factors. Some embodiments of this invention include a fingerprint imaging algorithm that classifies fingerprints into distinct types. Aspects of the invention determine and analyze correlations between these fingerprint types and personality traits to provide insights into individual personality profiles.

Performing human authentication using a portable distributed computing system based on graphene membranes involves leveraging the unique properties of graphene to integrate optical, ultrasound, and capacitance sensors. This would enable a seamless and unobstructed sensory and communication interface in distributed computing environments.

Graphene membrane properties are nearly transparent, allowing for the passage of light with minimal interference. Graphene is highly conductive and suitable for capacitance-based sensing. Flexibility and strength of graphene is incredibly strong yet flexible, making it ideal for various applications.

Graphene membrane fabrication is single or multilayer. Single-layer graphene for maximum transparency or multilayer for enhanced mechanical properties. Deposition techniques utilize chemical vapor deposition (CVD) or other advanced methods to create high-quality graphene membranes.

In an embodiment, optical sensors positioned behind the graphene membrane capture images or detect light through the transparent graphene layer. In an embodiment, ultrasound sensors having capacitive micromachined ultrasonic transducers (CMUT) or piezoelectric micromachined ultrasonic transducers (PMUT) are embedded in or beneath the graphene membrane for ultrasound signal transmission and reception. In an embodiment, capacitance sensors use the conductive properties of graphene to detect touch, pressure, or proximity.

In an embodiment, an authentication process involves data acquisition via optical data to capture high-resolution images of biometric features such as fingerprints, iris patterns, or facial features. In an embodiment, ultrasound data is obtained in 3D structural information of the skin or other biometric features, providing additional verification layers. In an embodiment, capacitance data changes to detect touches or proximity, ensuring the presence of a live user data fusion combining data from optical, ultrasound, and capacitance sensors to create a comprehensive biometric profile.

In an embodiment, methods of imaging, data acquisition, and communication include A-mode and B-mode imaging with graphene-based sensors. In an embodiment, A-mode imaging employs graphene-based transducers to transmit ultrasonic waves through the body and detect reflections from tissue interfaces. The high sensitivity of graphene enhances the detection of these reflections, enabling the generation of detailed two-dimensional cross-sectional images. In an embodiment, the A-mode signals are processed into B-mode representations, which are displayed as grayscale images to reveal fine details of biometric features. B-mode imaging utilizing graphene's exceptional electrical properties, In an embodiment, A-mode data is transformed into high-resolution B-mode grayscale images, where different tissues are visualized with varying shades of gray based on their reflectivity.

In an embodiment, one or more graphene-based sensors performs a Pulse-Echo technique. Graphene-based sensors measure the amplitude of reflected ultrasonic waves, mapping tissue reflectivity with greater precision. The superior performance of graphene in capturing and processing these signals results in detailed images of tissue structures, improving the accuracy of biometric data.

In an embodiment, one or more graphene-based sensors use electrical conductivity to measure the electrical impedance of the sensors. Such an impediographic technique allows precise differentiation between tissues based on their acoustic impedance. When ultrasonic waves encounter different acoustic impedances, graphene sensors accurately measure the reflected waves, enhancing the precision of tissue mapping and biometric data acquisition.

In an embodiment, one or more graphene-based sensors use a photoacoustic effect to convert light into sound. When tissues absorb high-energy light, such as from a laser, graphene's high thermal conductivity improves the conversion efficiency. In an embodiment, the resulting ultrasonic waves are used to generate detailed 2D or 3D images of the scanned areas, providing high-resolution insights into tissue structures.

In an embodiment, one or more graphene-based sensors use near-field acoustic holography (NAH) to measure sound fields in the near field. In an embodiment, one or more graphene-based transducers reconstruct the three-dimensional sound field, capturing high-resolution acoustic data, including evanescent waves. This approach enhances spatial resolution and ensures accurate biometric information acquisition.

In an embodiment, machine learning algorithms analyze and match the acquired data against stored biometric templates for implementing a decision-making algorithm to verify the identity of the user based on the fused data.

In an embodiment, data transmission via utility based blockchain incorporating Proof of Know Your Customer (Proof of KYC) is performed using a graphene membrane as a medium for transmitting sensory data between distributed computing nodes. These nodes are distributed via card formats used by almost every adult person in the world creating a global consensus to fine tune, correct, and effect the binary processing environments as part of the human to machine node consensus mechanism. This provides balance and accuracy between human and machine processes.

In an embodiment, the high conductivity of graphene for efficient and fast data transfer is used to increase the performance in tamper-resistant silicon for distributed mass ledger processing. Such an authentication processing workload distributed across multiple computing nodes will enhance speed and reliability.

In an embodiment, Proof of KYC is performed via a consensus mechanism used in blockchain networks that relies on a massive amount of node validators in distributed tamper-resistant micro computing to verify and validate transactions relating to graphene-based Proof of KYC. Validators take turns in producing new blocks and validating transactions.

An embodiment includes a scalable blockchain framework for on-chain processing within a distributed computing environment. This framework enhances the detection of personality traits, particularly the "chatterer" trait, by leveraging high-speed, high-capacity data processing and advanced analytical techniques. Global consensus with card formats is a method of distributing on-chain nodes in secure-core silicon used globally. An embodiment includes continuous and perpetual human input to fine-tune, correct, and balance the interaction between binary processing environments and human processes. This approach improves collaboration between human and machine processes for greater accuracy. An embodiment includes distributed authentication processing workloads that are distributed across multiple computing nodes, in order to enhance speed and reliability. This decentralized approach increases the system's robustness and efficiency in handling large-scale biometric data.

In an embodiment, biometric data is used to determine personality traits. An embodiment includes analysis of complex skin tissue patterns for neuron mapping and matching. This approach not only improves the accuracy of personality trait analysis but also provides a novel framework for integrating biometric data with psychological profiling. It highlights the benefits of combining advanced biometric techniques with psychological analysis to uncover deeper insights into human personality and character traits.

An embodiment includes creation of a framework capable of hyper-scaling to reach every individual globally, using the same card format the individual interacts with daily through on-chain Proof of KYC and mass human input. In an embodiment, each person may validate sensory data and verify character traits of others in a manner similar to a digital affidavit, supporting accuracy in transactional data.

In an embodiment, biometric data measured by the smartcard is processed by the smartcard to assist in authenticating that a particular human (as opposed to impersonation by another human or impersonation through an electronic interface) is entering into an electronic-based transaction.

Additionally, this invention serves as a critical "kill switch" to prevent technology from overriding or compromising natural life processes. It ensures that technological interactions are governed in a way that respects and preserves the essence of human life and maintains human control over machines.

For brain-computer interfaces (BCIs), graphene-based optical components enable high-speed, high-bandwidth data transmission between the brain and external devices. This leads to more efficient and precise control of prosthetics, computers, or other devices via thought. The lightweight and flexible nature of graphene could also make these interfaces more comfortable for long-term use. Furthermore, with react to neural interfaces, graphene-based electrodes improve the quality of brain signal acquisition. Their high surface area and electrical conductivity enhance the resolution of brain activity readings, leading to more accurate and detailed mapping of neural signals. One example is EEG (electroencephalography) and deep brain stimulation. Graphene-enhanced ultrasound technology enables non-invasive stimulation and imaging of the brain. For instance, it improves the resolution of brain imaging techniques, helping to visualize neural structures and activities more clearly. Additionally, it aids in non-invasive brain stimulation techniques, offering new ways to modulate brain activity for therapeutic purposes and physiological profiling.

FIG. 1 illustrates smartcard 10. Smartcard 10 includes integrated visual display 12 electrically connected to both power switch 14 and sensor array 16. In an embodiment, smartcard 10 includes a micro-computer and substrate inlay that is manufactured by standard hot and cold lamination, such as in smartcard manufacturing, and has a maximum z axis of 500 Microns for the inlay. In an embodiment, smartcard 10 has a physical size conforming to an ISO 7810 format, whose formats set out the physical mechanical requirements of maximum card z-axis, y-axis, and x-axis as follows in Table 1:

TABLE 1

| Format | Dimensions (mm) | Usage |
|---|---|---|
| ID-1 | 85.60 × 53.98 | EMV banking cards and ID cards. Size may also be referred to as CR-80 or TD1. |
| ID-2 | 105 × 74 | Older-style ID cards. Visas. |
| ID-3 | 125 × 88 | Passport booklets |
| ID-000 | 25 × 15 | Mini-SIM cards. |

Integrated visual display 12 may include one or more of the following display types: a flexible display, segmented displays, OLED (Organic Light Emitting Diode) displays, LCD (Liquid Crystal Display), and E-Paper (E-Ink) displays. Power switch 14 may be a membrane or tactile switch.

The microcomputer of smartcard 10 is electrically connected to the integrated visual display 12, the power switch 14, and the sensor array 16, and the microcomputer of smartcard 10 contains executable code to perform the acquisition of biometric data.

In an embodiment, sensor 16 includes quartz or quartz oxide.

In an embodiment, sensor 16 includes one or more graphene sensor elements for sensing one or more ultrasound signals, capacitance signals, and light signals.

In an embodiment, sensor 16 is manufactured as part of microcomputer 10 using a system-on-chip architecture.

When sensor 16 includes a graphene sensor element for sensing ultrasound waves and is subjected to ultrasound waves, the mechanical stress in the graphene sensor element causes a change in the electrical properties of the corresponding graphene layer (such as resistance or capacitance), which can be detected and measured. This change correlates with the ultrasound waves, allowing for precise imaging and sensing.

When sensor 16 includes a graphene sensor element for sensing capacitance, graphene sensor element for sensing capacitance comprises a graphene layer placed between two electrodes or within a capacitor-like structure. The graphene layer can be part of a planar or stacked configuration depending on the application for electrical capacitance imaging. The capacitance of a capacitor is influenced by the dielectric properties of the material between the electrodes.

When sensor 16 includes a graphene sensor element for sensing light, the graphene sensor element for sensing light comprises a thin film or multi-layered structure with other materials, and may include a photodetector in a graphene layer, or an optical waveguide integrated into the graphene layer.

In an embodiment, the graphene sensor elements that comprise sensor 16 are manufactured as part of microcomputer 10 using a system-on-chip architecture.

Figure 2:
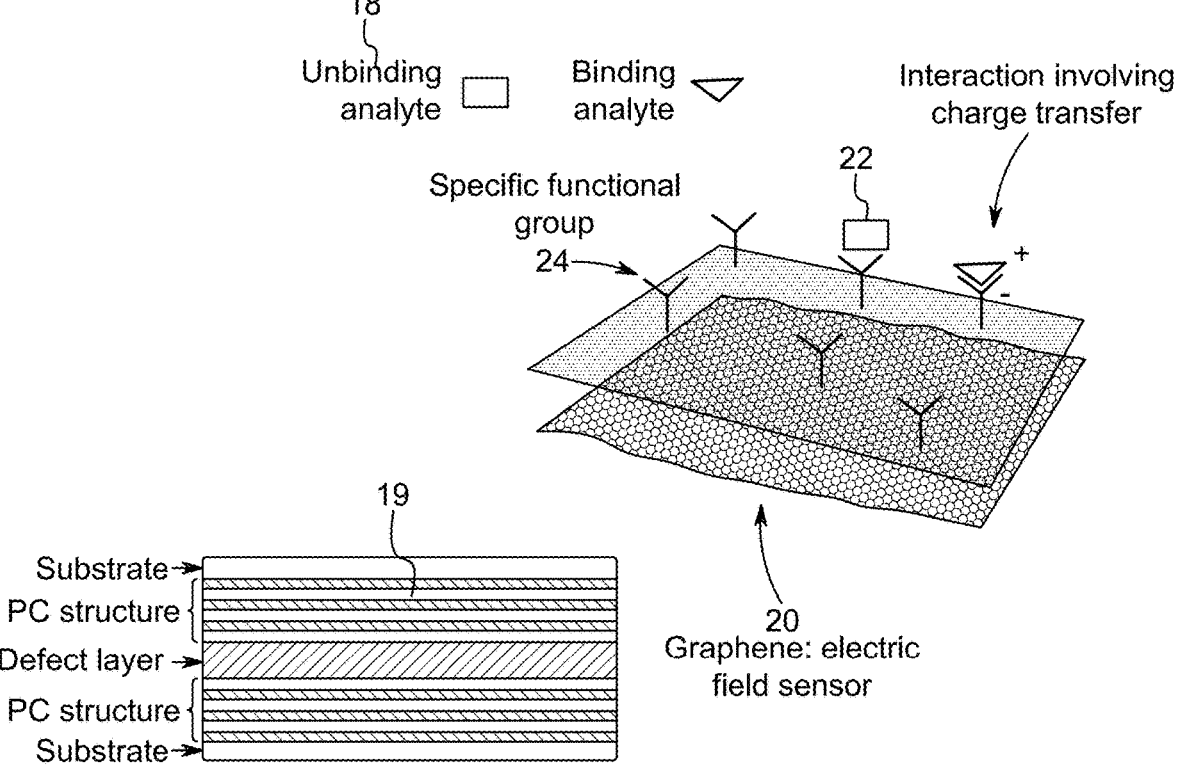
FIG. 2 illustrates a graphene membrane electrical capacitance sensor, which is integrated into the smartcard electrical substrate and mechanical mounting for finder skin imaging.

FIG. 2 illustrates the scientific principles underlying operation of graphene sensor elements in smartcard 10, with respect to graphene-based electric field sensor 20 that includes molecular analyte layers 19 in physical contact with graphene layer 24. Analyte 18 refers to the process where a specific molecule or substance (the analyte) interacts with and binds or unbinds to a sensor's active material (e.g., graphene) in a detectable way. In particular, a graphene-based ultrasound sensor's analyte changes the density or viscoelastic properties of the medium surrounding the graphene in response to ultrasound waves traveling through the material.

With respect to molecular analyte layers 19, Particle Composite Structure (PC Structure) is the composition and arrangement of particles within a composite material and membrane-based substrates. Molecular analyte layers 19 are the thin layers or coatings on a substrate that contain the target molecules or analytes of interest. These layers make up the optical, electrical capacitance, and ultrasound sensing functions. Unbinding involves separating the analyte molecules from the layer they are bound to. Molecular analyte layers 19 is a visual representation of sandwiched pieces of PC structures, which are split in the structure from the sensing layers.

Similarly, in a graphene-based capacitance sensor, the analyte binds to the graphene layer or the surface of the sensor, altering the local environment. For example, if the analyte is an ion or a molecule that interacts with the graphene surface, it may change the surface charge density or the dielectric properties of the environment of the electrical field. The binding alters the capacitance between the electrodes of the sensor. By measuring changes in capacitance, the presence and concentration of the analyte can be determined via electrical charge transfers 22. Graphene-based optical sensor's binding analyte interacts with the graphene layer 24, causing changes in its optical properties due to shifts in absorption, reflection, or scattering of light.

Figure 3:
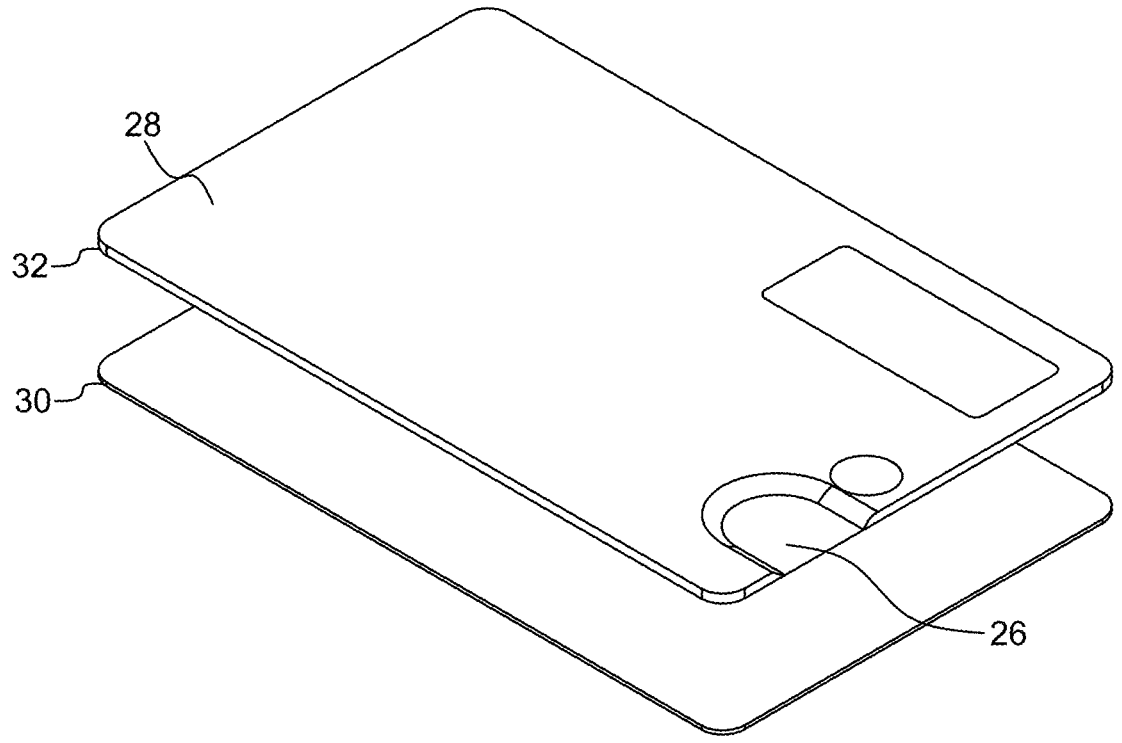
FIG. 3 illustrates the smartcard hot or cold laminate ISO card mechanical structure.

FIG. 3 illustrates the outer construction of smartcard 10 in additional detail. Top face 28, bottom face 28, and inlay 32 are constructed with one or both of PVC (polyvinyl chloride) and PET (polyethylene terephthalate), or a composite of these materials. One side of top face 28 has a bezeled opening, shaped in the form of a finger tip to accommodate finger access to sensor 26 (corresponding to sensor 16 in FIG. 1), with additional apertures (not shown in FIG. 3) in top face 28 to accommodate power switch 14 of FIG. 1 and integrated visual display 12 of FIG. 1.

Figure 4:
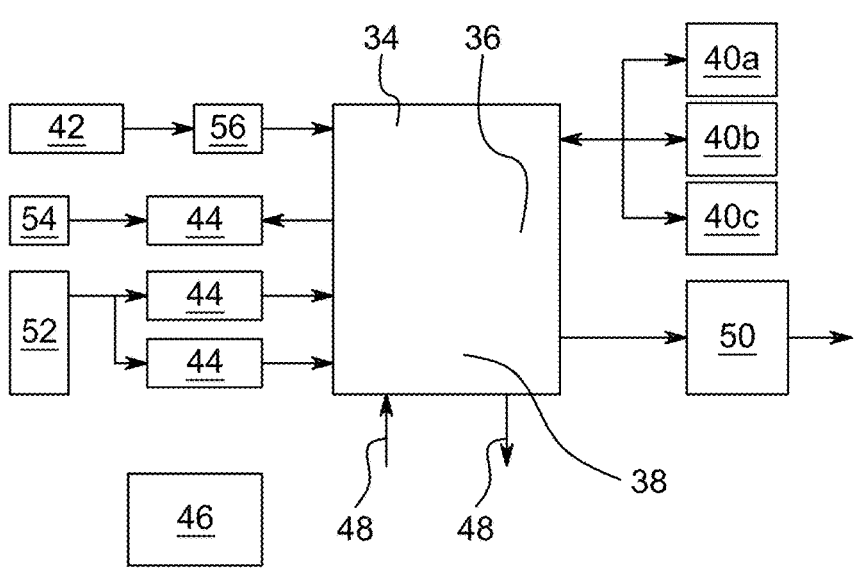
FIG. 4 illustrates the block electrical schematic, active and passive components, and battery of the smartcard.

FIG. 4 illustrates a block electrical schematic for smartcard 10. CPU 34 includes chip features 36, and reset controller 38. For example, CPU 34 may be a Secure-Core-Silicon Tamper-Resistant ARM7TDMI CPU, having chip features 36 such as on-chip Flash 64K Bytes, on-chip SRAM with 55 MHz Clock, and SPI Controller UART. Reset controller 38 may be a JTAG I/F with 1.8V Core and 3.3V I/O.

Sensor logic 40 resides on CPU 34 and is electrically connected to sensor 16 of FIG. 1. Sensor logic 40 may include optical sensor logic 40a, ultrasound sensor logic 40b, and capacitance sensor logic 40c; each sensor logic sends 3V logical interrupts to CPU 34. Although not explicitly shown in the Figures, it is understood that both sensor 16 and sensor logic 40 both reside on CPU 34 using a system-on-chip architecture. Particularly, as graphene is a single layer of carbon atoms arranged in a hexagonal lattice, making its intrinsic thickness only one atom thick (or approximately 0.34 nanometers), system-on-chip graphene to silicon gates on the scale of 5 to 10 nanometers for current secure-core silicon wafer fabrication is possible.

Display logic and electrical driver visual output 50 is electrically connected to both CPU 34 and the integrated visual display 12 of FIG. 1.

Transmit and Receive signals 48 from physical antennas 46 communicate with CPU 34. Physical antennas 46 may communicate with CPU 34 using radio frequency packet-based communication.

Quartz or silicon oscillator 42 is electrically connected to CPU 34. Buffer 56 is a 3.0V 3.00 MHz buffer connected to quartz or silicon oscillator 42.

Power management and switching regulator 44a is electrically connected to both CPU 34 and power switch 54 (corresponding to power switch 14 in FIG. 1).

Power management and switching regulators 44b and 44c are electrically connected to both CPU 34 and battery 52. Battery 52 may be a primary cell battery having a voltage between 2 and 3 Volts.

Figure 5:
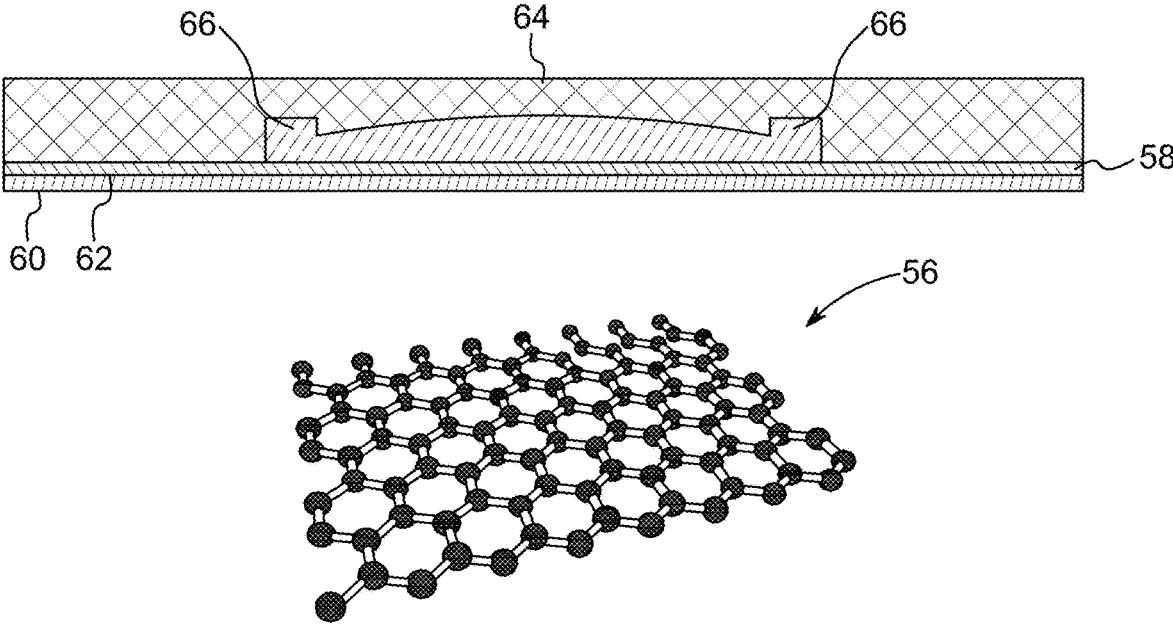
FIG. 5 illustrates the basic element structure of a graphene sensor for ultrasound, optical, and capacitance imaging.

FIG. 5 illustrates graphene layer 56 structure of sensor 16 of FIG. 1, along with a schematic structure of the additional components comprising sensor 16.

Active sensing material 58 consists of a single or few layers of graphene generally having the structure indicted by graphene layer 56, and is responsible for detecting changes in the environment, such as variations in electrical resistance, optical properties, and physical parameters to mirror-computers interrogated in ISO cards The graphene of active sensing material 58 is deposited upon substrate layer 60. Common substrates used in substrate layer 60 include silicon (Si), silicon dioxide ($SiO_2$), or flexible polymers, and the choice of substrate layer 60 may influence the mechanical properties of sensor 16 of FIG. 1.

Electrodes 62 are electrically connected to active sensing material 58, and provide the interconnects and interfaces with logic from silicon gates that is part of sensor logic 40 of FIG. 4. Electrodes 62 are usually made of metals such as gold (Au), silver (Ag), or copper (Cu), and facilitate the measurement of changes in the properties of active sensing material 58.

Passivation layer 64 serves as a protective coating shielding active sensing material 58 (and any functionalization layer) and underlying structures from environmental damage or contamination. Polymethyl methacrylate (PMMA) or other polymers are commonly used as passivation layer 64. Bezel finger guide 66 is molded into passivation layer 64.

Figure 6:
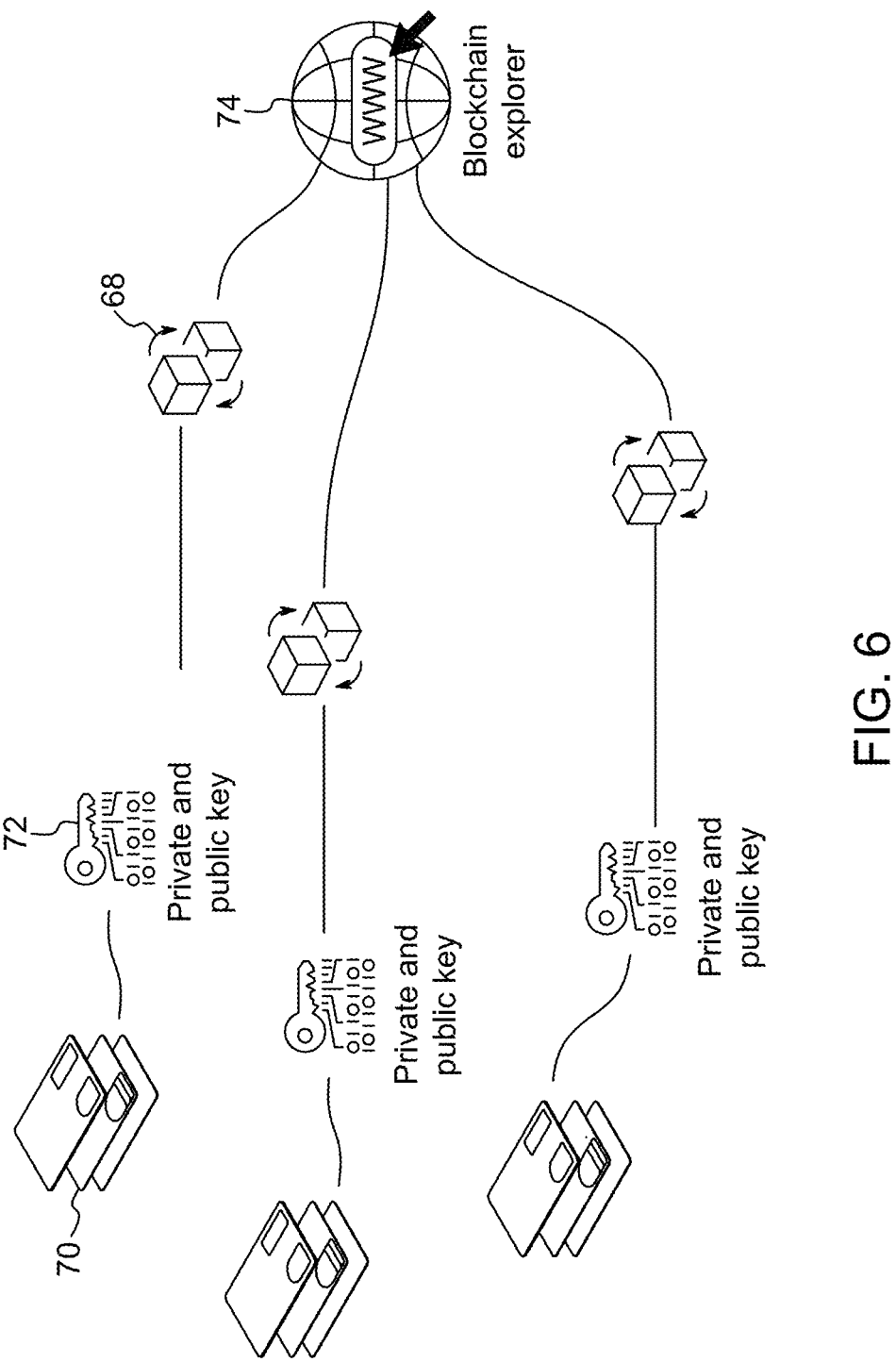
FIG. 6 illustrates Quorum Ethereum Virtual machine (EVM) with the novel art of Proof-of-KYC in consensus on-chain node processing.

FIG. 6 illustrates a process in which graphene-based biometric and psychological profiling authentication smartcard format 70 performs KYC first, then generates three private-public encryption key pairs.

Quorum Ethereum Virtual Machine (EVM) cloud server node 68 enables secure and private transactions suitable for scenarios requiring confidentiality and controlled access. An asymmetric encryption is employed to ensure that only the designated countries parties and the KYC was verified between the parties (destination organization) can decrypt and access the transaction data, while keeping the content obfuscated from unauthorized parties.

The process begins with the generation of public-private key pairs 72 for each participating party, including the destination party and organization party The public keys are shared, and the private keys remain securely stored by each respective party obfuscated.

Upon receiving a consumer message, Quorum EVM computes the transaction data hash using a cryptographic hash function, such as SHA-256. The message is then encrypted multiple times, each time using the public key of one of the authorized parties. Specifically, the message is first encrypted using the destination organization's public key, followed by encryption with the public keys of the originating party. This produces a series of encrypted ciphertexts corresponding to each party.

These encrypted messages, along with metadata indicating the associated public key for each ciphertext, are stored on-chain within the Quorum EVM 68. The storage ensures that the message remains unreadable to the public while allowing the authorized parties to retrieve their respective ciphertexts.

When any authorized party (e.g., the destination organization) needs to access the message, the party retrieves the corresponding encrypted ciphertext from the blockchain. The private key corresponding to the party's public key is then used to decrypt the message, ensuring that only the intended recipients can access the content.

While the foregoing is directed to embodiments of the present invention, other and further embodiments of the present invention may be devised without departing from the basic scope thereof, and the scope thereof is determined by the claims that follow.

What is claimed is:

1. A computer-implemented method of transaction recordation, comprising:

each human party of plurality of parties performing a KYC operation using a corresponding smartcard that measures biometric data;

based on each performed KYC operation, the corresponding smartcard generates a private-public encryption key pair;

in response to transaction data for a transaction among the plurality of parties being received by an Ethereum Virtual Machine, the Ethereum Virtual Machine:

computes a transaction data hash using at least a portion of the received transaction data by performing a cryptographic hash function;

encrypts the transaction data hash using a public key of a destination organization;

for each human party of the plurality of parties, the Ethereum Virtual Machine encrypts the encrypted transaction data hash using the corresponding public key to generate a corresponding encrypted ciphertext message; and for each corresponding encrypted ciphertext message, store the corresponding encrypted ciphertext message and the associated public key on-chain.

* * * * *